(12) United States Patent
Nicholson et al.

(10) Patent No.: US 11,508,033 B2
(45) Date of Patent: Nov. 22, 2022

(54) DISPLAY-COVERED CAMERA

(71) Applicant: Lenovo (Singapore) Pte. Ltd., Singapore (SG)

(72) Inventors: John Weldon Nicholson, Cary, NC (US); Howard Locker, Cary, NC (US); Daryl Cromer, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 402 days.

(21) Appl. No.: 16/735,334

(22) Filed: Jan. 6, 2020

(65) Prior Publication Data

US 2021/0209728 A1 Jul. 8, 2021

(51) Int. Cl.
| | |
|---|---|
| *G06T 3/40* | (2006.01) |
| *G06T 11/60* | (2006.01) |
| *G03B 7/0997* | (2021.01) |
| *H04M 1/02* | (2006.01) |

(52) U.S. Cl.
CPC ........ *G06T 3/4038* (2013.01); *G03B 7/09977* (2015.01); *G06T 11/60* (2013.01); *G03B 2205/0053* (2013.01); *H04M 1/0264* (2013.01)

(58) Field of Classification Search
CPC ... G06T 3/4038; G06T 11/60; G03B 7/09977; G03B 2205/0053; H04M 1/0264; H04M 1/0266; H04N 7/183; H04N 5/23216; H04N 5/232; H04N 5/2624
See application file for complete search history.

(56) References Cited

U.S. PATENT DOCUMENTS

| | | | | |
|---|---|---|---|---|
| 9,754,526 B2* | 9/2017 | Evans, V | ................ | G06F 3/017 |
| 2014/0078383 A1* | 3/2014 | Schmaelzle | ............ | G03B 15/02 |
| | | | | 348/E5.026 |
| 2014/0184521 A1* | 7/2014 | Kwong | ................ | G03B 17/12 |
| | | | | 345/173 |
| 2016/0156834 A1* | 6/2016 | Kim | ...................... | G03B 35/10 |
| | | | | 348/302 |
| 2017/0124942 A1* | 5/2017 | Evans, V | ............ | G02B 27/0093 |
| 2018/0341290 A1* | 11/2018 | Sim | ........................ | G06F 3/042 |
| 2019/0186999 A1* | 6/2019 | Steffanson | ............ | G01J 5/0853 |

* cited by examiner

*Primary Examiner* — Christopher M Brandt
(74) *Attorney, Agent, or Firm* — Ference & Associates LLC (57) ABSTRACT

One embodiment provides a method, including: receiving, at an information handling device having a display, an indication to capture an image of a scene using a camera sensor positioned underneath the display; capturing, responsive to the receiving, a plurality of partial images of the scene, wherein the capturing comprises adjusting, using an adjustment mechanism, a physical position of the camera sensor after each of the plurality of partial images of the scene are captured; and stitching, subsequent to the capturing, the plurality of partial images together to form the image of the scene. Other aspects are described and claimed.

19 Claims, 8 Drawing Sheets

DISPLAY-COVERED CAMERA

BACKGROUND

Modern information handling devices ("devices"), for example smart phones, tablets, laptop and personal computers, other electronic devices, and the like, comprise a front-facing camera integrated into the device that is capable of capturing images, videos, etc. Conventionally, most front-facing cameras are integrated into a top portion of the bezel that surrounds a display screen of the device. Advances in technology have led to near bezel-less displays, where the display screen occupies nearly the entire front area of the device. In these configurations, many bezel-less, or near bezel-less, devices integrate the front-facing camera into a notch that protrudes down from the top of the device into an upper portion of the display screen area. Additionally or alternatively, other bezel-less models adopt a "hole-punch" configuration in which the front-facing camera is resident in a hole that is itself completely surrounded by the display screen.

BRIEF SUMMARY

In summary, one aspect provides a method, comprising: receiving, at an information handling device having a display, an indication to capture an image of a scene using a camera sensor positioned underneath the display; capturing, responsive to the receiving, a plurality of partial images of the scene, wherein the capturing comprises adjusting, using an adjustment mechanism, a physical position of the camera sensor after each of the plurality of partial images of the scene are captured; and stitching, subsequent to the capturing, the plurality of partial images together to form the image of the scene.

Another aspect provides an information handling device, comprising: a display; a camera sensor positioned underneath the display; an adjustment mechanism operatively coupled to the camera sensor; a processor; a memory device that stores instructions executable by the processor to: receive an indication to capture an image of a scene using the camera sensor; capture, responsive to the receiving, a plurality of partial images of the scene, wherein the capturing comprises adjusting, using the adjustment mechanism, a physical position of the camera sensor after each of the plurality of partial images of the scene are captured; and stitch, subsequent to the capturing, the plurality of partial images together to form the image of the scene.

A further aspect provides a method, comprising: receiving, at an information handling device, an indication to activate a camera sensor positioned underneath a display of the information handling device; directing, using a mirror array positioned underneath the display, light to the camera sensor; and capturing, responsive to the directing, an image using the activated camera sensor.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-B) illustrates an example configuration of pixels on a display.

FIG. 6(A-B) illustrates an example adjustment of a camera sensor according to an embodiment.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Many devices, smart phones in particular, are moving toward a bezel-less display. Such a design may not only be aesthetically pleasing to a user but may also allow applications to leverage their utility across a greater surface area. Another advantage may be that a user may be provided with a larger screen in a smaller package. However, the current trend of integrating the front-facing camera ("camera") into a notch (i.e., an area that extends down from the top of the device into a portion of the display area) prevents a full bezel-less display from being achieved.

One potential method of removing the notch is to situate the camera underneath the display area. This configuration may allow the display area to be fully extended up to the top of the device, thereby allowing the display area to occupy all, or nearly all, of the front region of the device. However, one issue with this solution is that the light capturing abilities of the camera are degraded by the pixels situated in front it.

Accordingly, an embodiment provides a method for capturing an image of a scene using a camera sensor positioned beneath a display screen of a device. In an embodiment, an indication may be received at a device to capture an image of a scene using a camera sensor positioned underneath a display of the device. Responsive to receiving this indication, an embodiment may capture a plurality of "partial" images of the scene using the camera sensor. More particularly, an embodiment may capture a first image of the scene when the camera sensor is positioned at a first position and then, using an adjustment mechanism, adjust a position of the camera sensor to a second position and thereafter capture a second image. The adjustment of the physical position of the camera sensor correspondingly adjusts the positions of the camera sensor pixels, thereby allowing certain columned groups of camera sensor pixels to be positioned, at least partially, within a transparent portion that exists between subpixel color elements, which allows for unobstructed image capture on these camera sensor pixels. Such a process may be repeated a predetermined number of times (e.g., until each columned group of camera sensor pixels is able to capture image data while being situated in the transparent portion, etc.). Once the capturing process is complete, an embodiment may stitch the plurality of partial images of the scene together to form a completed image. Such a method may therefore be utilized to capture an image of a scene using a submerged camera without degrading the amount of light that will be captured by the camera subsystem.

In another embodiment, an indication to activate a camera sensor positioned underneath a display of a device may be received. The camera sensor may thereafter capture an image a scene using a mirror array that is also positioned underneath the display. More particularly, the mirror array may guide light traveling through the display to the camera sensor. Such a method may therefore also capture an image of a scene using a submerged camera without succumbing to light degradation resulting from the foreground pixels.

The illustrated example embodiments will be best understood by reference to the figures. The following description is intended only by way of example, and simply illustrates certain example embodiments.

Figure 1:
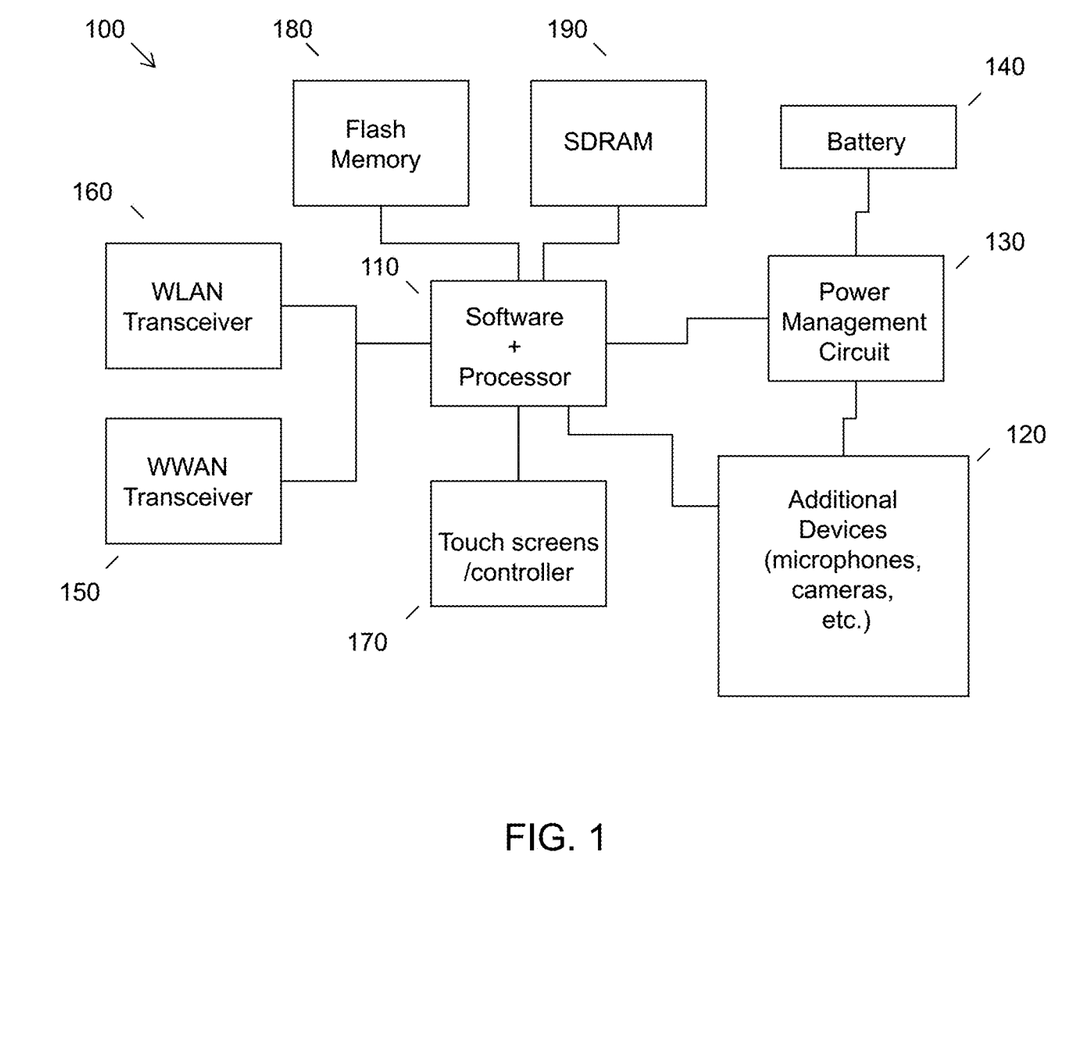
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
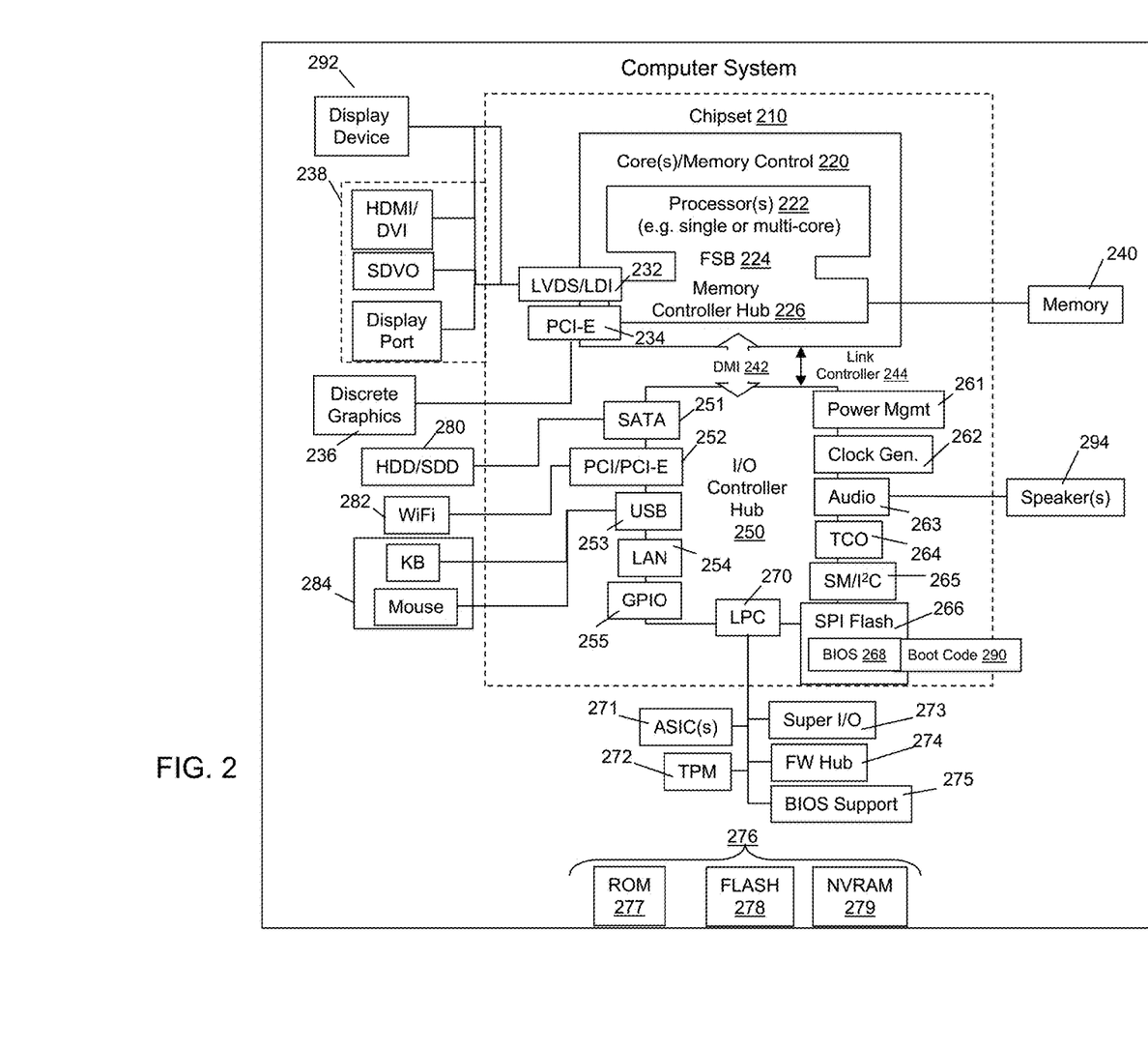
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart displays, laptops, and/or electronic devices that may support one or more integrated cameras (e.g., a worldview camera, a front-facing camera, etc.). For example, the circuitry outlined in FIG. 1 may be implemented in a tablet or smart phone embodiment, whereas the circuitry outlined in FIG. 2 may be implemented in a laptop.

Figure 3:
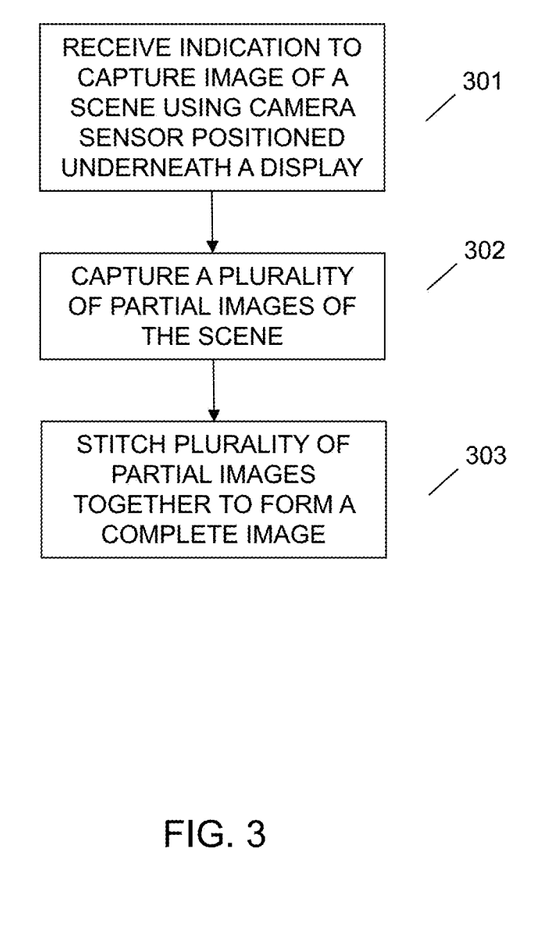
FIG. 3 illustrates an example method of capturing an image of a scene using a camera sensor positioned beneath a display screen of a device.

Referring now to FIG. 3, an embodiment provides a method for capturing an image of a scene using a camera positioned underneath a display of a device. At 301, an embodiment may receive an indication to capture an image of a scene using a camera sensor. In an embodiment, the camera sensor may be a front-facing camera that may be positioned underneath a portion of a display area (e.g., a touch-sensitive display area, etc.) on a front surface of the device. In an embodiment, the display area may be an edge-to-edge display area. More particularly, in an embodiment, the edge-to-edge display area may constitute substantially the entire front surface of the device, effectively eliminating the bezel.

In an embodiment, the indication may be derived from a user-command to activate the camera. In one non-limiting example, a user may provide touch input to a camera application icon displayed on the display screen. As another non-limiting example, a user may provide a voice command (e.g., to an audio capture device operatively coupled to the device, etc.) to activate the camera. Alternatively, an embodiment may derive this indication dynamically from context analysis. For example, an embodiment may automatically activate a camera responsive to detecting that a user is within a predetermined threshold distance from the device (e.g., using one or more proximity sensors, using data gathered by other devices and transmitted to the device, etc.). In another non-limiting example, an embodiment may automatically activate a camera responsive to detecting that the device is in a camera-activating orientation (e.g., a user has raised their device from a horizontal position to a vertical position, etc.).

Figure 4A:
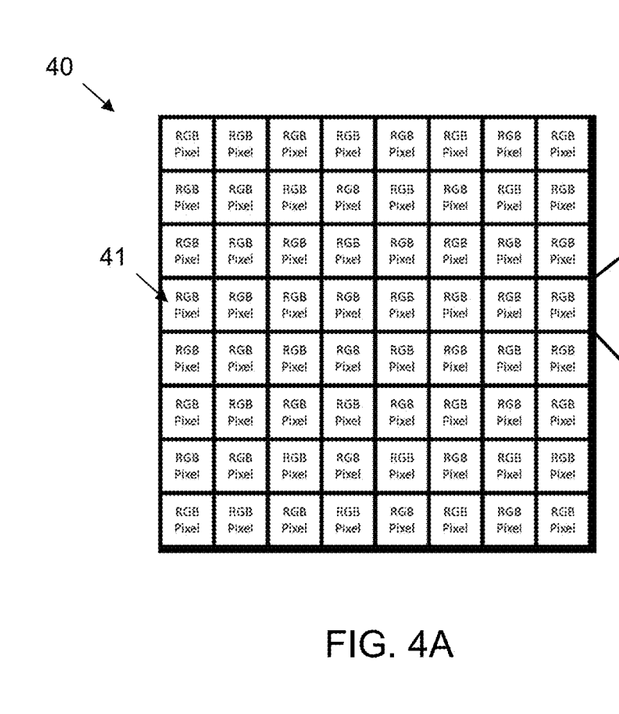
Figure 4B:
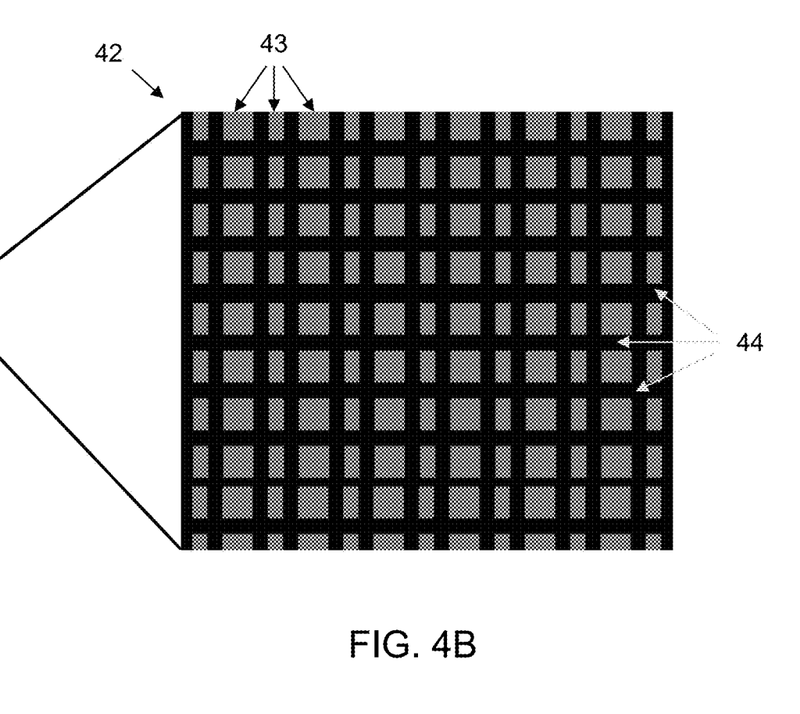

In an embodiment, the display of the device may be composed of a grid of pixels. More particularly, and with reference to FIG. 4(A-B), the pixels of the display may be arranged in a grid 40 as illustrated. Each pixel 41 in the grid 40 may itself be composed of a grid 42 of subpixel color elements 43. Separating these subpixel color elements 43 from one another is a "black area" 44 that corresponds to transparent space. Stated differently, the black area is an area where light may shine through to reach the camera sensor positioned beneath the pixels on the display.

Figure 5:
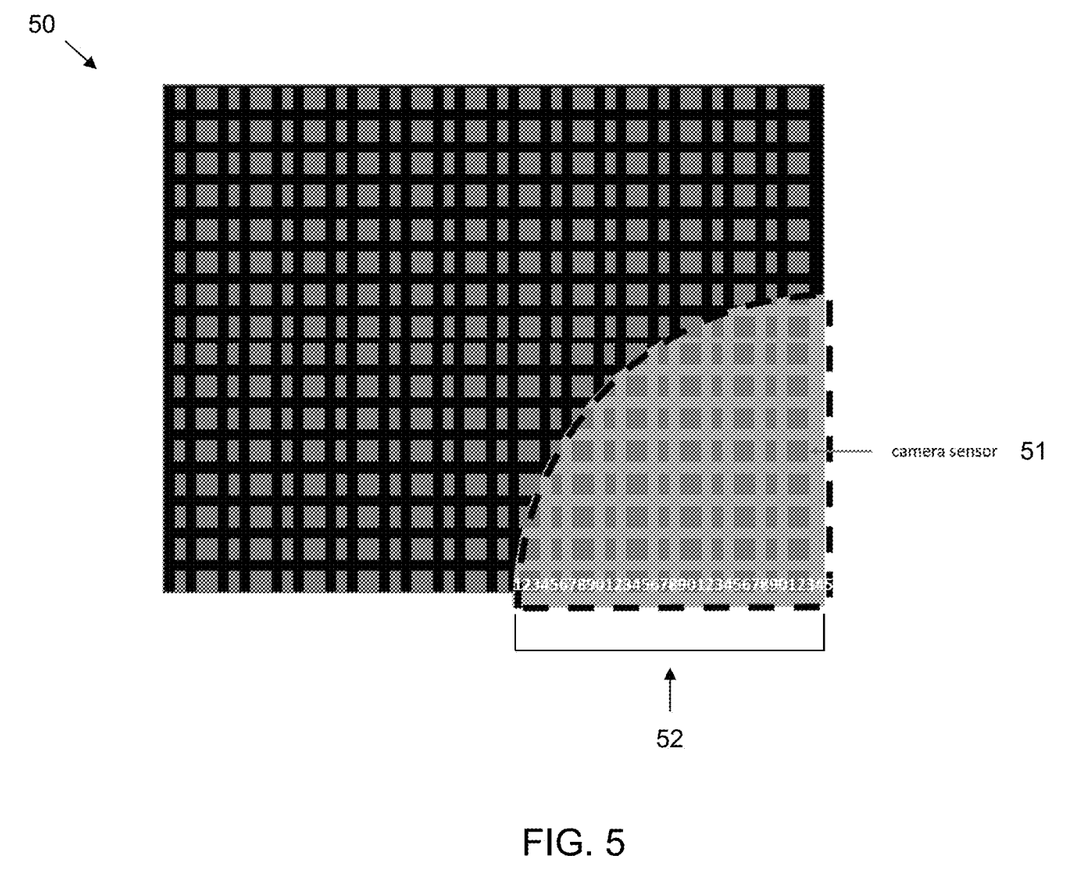
FIG. 5 illustrates a grid of subpixel color elements.

In an embodiment, the camera sensor may be composed of a plurality of camera sensor pixels grouped into a plurality of columned groups. The camera sensor pixels may be smaller than the subpixel color elements and one or more of the columned groups may, at any given time, be situated at least partially underneath the black area separating the subpixel color elements, as described above. For example, referring now to FIG. 5, a grid 50 of subpixel color elements is illustrated in which a camera sensor 51 comprising a plurality of columned groups 52 (i.e., groups numbered from 0-9) is positioned beneath the grid 50.

At 302, an embodiment may capture a plurality of partial images of the scene. In the context of this application, a partial image may refer to an actual image captured by the camera sensor that is not the final image. Stated differently, the capturing of the partial images is a backend process and the partial images are not presented to the user or displayed on the display.

In an embodiment, the capturing of the partial images may involve adjusting a physical position of the camera sensor after each of the partial images is taken. In an embodiment, the adjusting may be facilitated by an adjustment mechanism operatively coupled to the camera sensor. For example, the adjustment mechanism may be a movable object that the camera sensor is placed upon. Additionally or alternatively, the adjustment mechanism may be an object that facilitates physical movement of the camera sensor by contacting the camera sensor in a particular way. In an embodiment, adjusting the physical position of the camera sensor may involve translating the camera sensor, rotating the camera sensor, moving the camera sensor in some other manner, a combination of the foregoing, and the like.

Figure 6A:
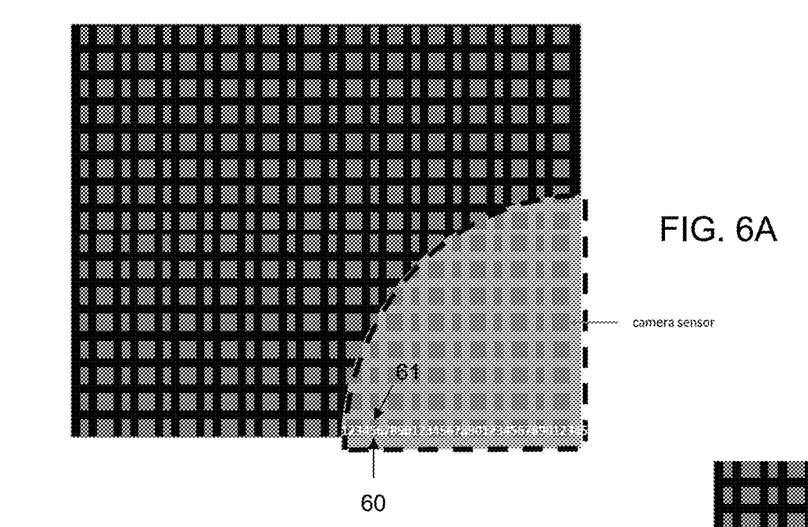
Figure 6B:
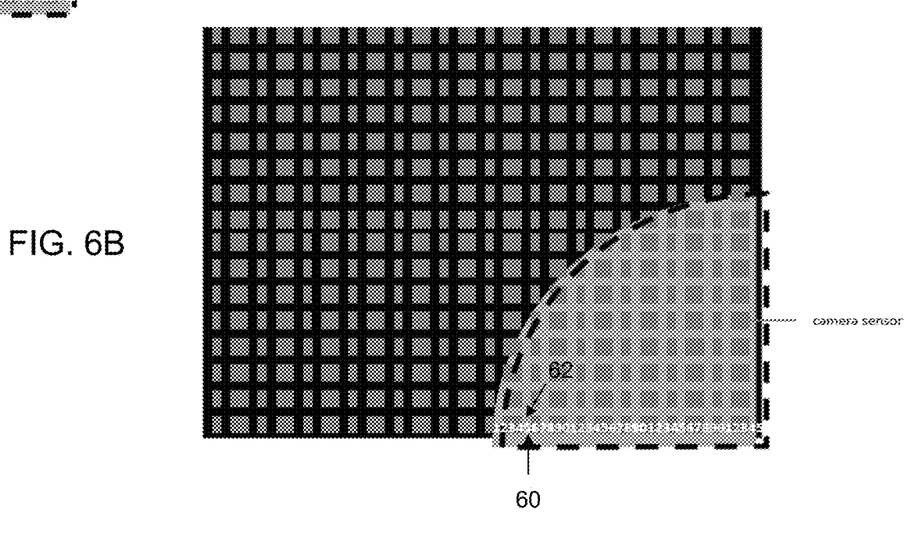

In an embodiment, the adjustment of the physical position of the camera sensor may correspondingly adjust a positioning of the columned groups of camera sensor pixels. More particularly, as an example and with reference to FIG. 6(A-B), a columned group of camera sensor pixels (e.g., Column Group 5) 60 may be positioned underneath a subpixel color element 61 during capture of the first partial image but may then, after the first partial image is captured and the physical position of the camera sensor is adjusted as shown in FIG. 6B, be positioned underneath the transparent area 62 during capture of the second partial image. In this way, each partial image may be captured utilizing a different spatial configuration of the columned groups of camera sensor pixels. Such a process may allow light to reach each camera sensor pixel of the camera sensor.

Accordingly, to summarize the foregoing processes, responsive to receiving a request to capture an image, an embodiment may capture a first partial image at a first physical position of the camera sensor (i.e., the original position). Thereafter, the physical position of the camera sensor may be adjusted (i.e., by the adjustment mechanism) to a second position, different than the original position, and a second partial image may then be taken. This process may be repeated a predetermined number of times (e.g., until each columned group of camera sensor pixels is positioned at least partially in the transparent area during an instance of partial image capture, a predetermined number of times as established by a manufacturer, etc.).

At 303, an embodiment may stitch the plurality of partial images together to form the completed image of the scene. The image stitching and/or editing may be facilitated using one or more stitching and/or editing techniques known in the art. In an embodiment, the stitching processes may identify and remove the degraded portions of the partial images (i.e., where a camera sensor pixel was positioned underneath a subpixel color element) and maintain and combine the quality portions (i.e., where a camera sensor pixel was positioned underneath a transparent area portion).

In an embodiment, the image stitching may occur automatically and may not require any additional user input. In an embodiment, after the plurality of partial images are stitched together, the final image may be presented to the user (e.g., on the display, etc.). After the capturing of the partial images is complete and/or once the image stitching is complete, an embodiment may reset the position of the camera sensor (e.g., return the camera sensor to its original physical position, etc.).

Figure 7:
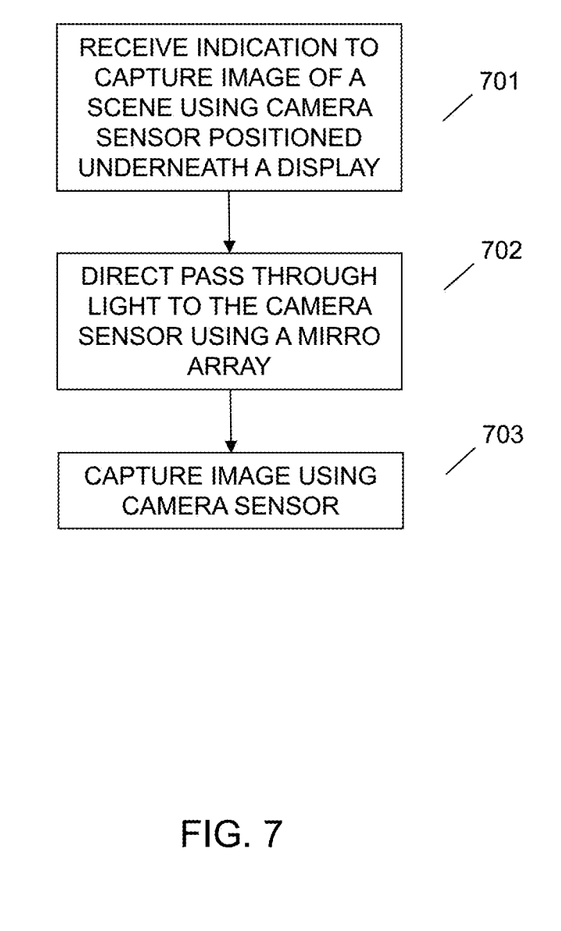
FIG. 7 illustrates an example method of capturing an image of a scene using a camera sensor positioned beneath a display screen of a device via use of a mirror array.

Referring now to FIG. 7, an embodiment provides another method for capturing an image of a scene using a camera positioned underneath a display of a device. At 701, an embodiment may receive an indication to activate a camera positioned underneath a display of a device, as previously described for Step 301. At 702, an embodiment may utilize a mirror array to direct light, seeping through the display, to the camera sensor. In an embodiment, the mirror array may also be positioned underneath the display and may comprise one or more microelectromechanical systems (MEMS) micro-mirrors. Utilizing this light, an embodiment may thereafter be able to capture, at 703, an image using the activated camera sensor. More particularly, in an embodiment, multiple mirrors situated at different angles with respect to the camera sensor may be utilized to guide a sufficient amount of light to the camera sensor. In this configuration, only one image needs to be captured. Alternatively, in another embodiment, a single mirror may be utilized that mechanically moves to adjust its angle with respect to the camera sensor. Such a configuration may allow all, or a majority of, the camera sensor pixels to be exposed to the light. Accordingly, in this configuration, multiple images may be captured (i.e., multiple partial images may be captured in quick succession), wherein each image exposes different camera sensor pixels to the light due to the angle adjustment of the mirror. Thereafter, these partial images may stitched together to form a completed image.

Figure 8:
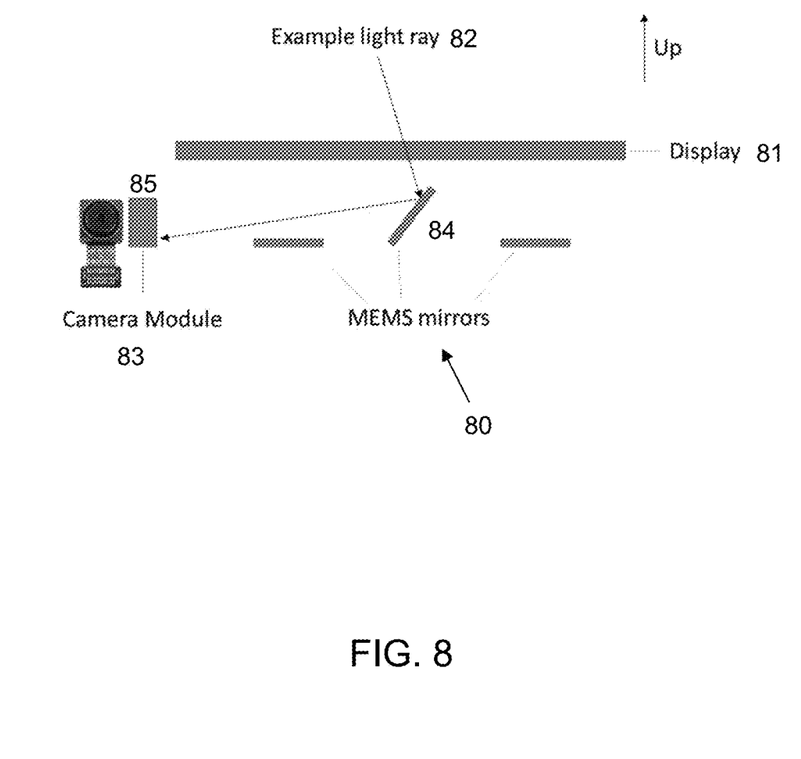
FIG. 8 illustrates an example configuration of a mirror array according to an embodiment.

Referring now to FIG. 8, an illustration of a non-limiting MEMS micro-mirror array configuration is provided. As illustrated in FIG. 8, the mirror array 80 may be positioned underneath a display 81 of a device. The mirror array 80 may direct light 82 passing through the display 81 to a camera sensor 83. The direction of the light 82 to the camera sensor 83 may be facilitated by steering the light over a given arc length using a first mirror 84, oriented at a predetermined angle, toward a second mirror 85. The second mirror 85 may thereafter steer the light to yet another mirror or onto the camera sensor 83. Given that the second or $N^{th}$ mirror is in a different physical location than the first mirror, which is positioned directly underneath the display pixels, the obstruction from the display pixels will be reduced.

The various embodiments described herein thus represent a technical improvement to conventional camera utilization techniques. Using the techniques described herein, an embodiment may allow for a substantially bezel-less display area while simultaneously preserving the functionality of a front-facing camera. In an embodiment, the camera may be positioned at a location underneath the display area. When an indication is received to capture an image using the camera, an embodiment may take a plurality of partial images during which a physical position of the camera sensor is adjusted after each partial image capture. An embodiment may then stitch the partial images together to derive a completed final image. Alternatively to the foregoing, an embodiment may utilize a mirror array configuration to direct light passing through the display to a buried camera sensor. After obtaining the appropriate amount of light, an embodiment may capture an image using this buried camera sensor. Such methods may preserve the functionality of a camera positioned beneath a display area and also may prevent the degradation of camera image quality when the camera is in use.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device having a display, an indication to capture an image of a scene using a camera sensor positioned underneath the display;
   capturing, responsive to the receiving, a plurality of partial images of the scene, wherein the capturing comprises adjusting, using an adjustment mechanism, a physical position of the camera sensor after each of the plurality of partial images of the scene are captured; and
   stitching, subsequent to the capturing, the plurality of partial images together to form the image of the scene.

2. The method of claim 1, wherein the display comprises:
   a grid of pixels, each of the pixels in the grid being composed of another grid of subpixel color elements;
   wherein each subpixel color element in the another grid is separated from other subpixel color elements by a transparent portion.

3. The method of claim 2, wherein the camera sensor comprises:
   a plurality of columned groups of camera sensor pixels;
   wherein the camera sensor pixels are smaller than the subpixel color elements;
   wherein at least one columned group of camera sensor pixels in the plurality of columned groups is situated at least partially in the transparent portion at any physical position of the camera sensor.

4. The method of claim 3, wherein the adjusting the physical position of the camera sensor correspondingly changes which of the at least one columned groups of camera sensor pixels is situated in the transparent portion.

5. The method of claim 4, wherein the at least one columned group of camera sensor pixels situated in the transparent portion is different for each partial image of the plurality of partial images of the scene.

6. The method of claim 5, wherein the stitching comprises combining, from each of the plurality of partial images, image data obtained from the at least one columned group of camera sensor pixels situated in the transparent portion.

7. The method of claim 1, wherein the adjusting comprises adjusting the physical position of the camera sensor a predetermined number of times.

8. The method of claim 1, wherein the adjusting comprises translating the physical position of the camera sensor.

9. The method of claim 1, wherein the adjusting comprises rotating the physical position of the camera sensor.

10. The method of claim 1, further comprising adjusting the physical position of the camera sensor back to an original physical position subsequent to the stitching.

11. An information handling device, comprising:
    a display;
    a camera sensor positioned underneath the display;
    an adjustment mechanism operatively coupled to the camera sensor;
    a processor;
    a memory device that stores instructions executable by the processor to:
    receive an indication to capture an image of a scene using the camera sensor;
    capture, responsive to the receiving, a plurality of partial images of the scene, wherein the capturing comprises adjusting, using the adjustment mechanism, a physical position of the camera sensor after each of the plurality of partial images of the scene are captured; and
    stitch, subsequent to the capturing, the plurality of partial images together to form the image of the scene.

12. The information handling device of claim 11, wherein the display comprises:
    a grid of pixels, each of the pixels in the grid being composed of another grid of subpixel color elements;
    wherein each subpixel color element in the another grid is separated from other subpixel color elements by a transparent portion.

13. The information handling device of claim 12, wherein the camera sensor comprises:
    a plurality of columned groups of camera sensor pixels;
    wherein the camera sensor pixels are smaller than the subpixel color elements;
    wherein at least one columned group of camera sensor pixels in the plurality of columned groups is situated at least partially in the transparent portion at any physical position of the camera sensor.

14. The information handling device of claim 13, wherein the instructions executable by the processor to adjust the physical position of the camera sensor correspondingly change which of the at least one columned groups of camera sensor pixels are situated in the transparent portion.

15. The information handling device of claim 14, wherein the at least one columned group of camera sensor pixels situated in the transparent portion is different for each partial image of the plurality of partial images of the scene.

16. The information handling device of claim 15, wherein the instructions executable by the processor to stitch comprise instructions executable by the processor to combine, from each of the plurality of partial images, image data obtained from the at least one columned group of camera sensor pixels situated in the transparent portion.

17. The information handling device of claim 11, wherein the instructions executable by the processor to adjust comprise instructions executable by the processor to translate the physical position of the camera sensor.

18. The information handling device of claim 11, wherein the instructions executable by the processor to adjust comprise instructions executable by the processor to rotate the physical position of the camera sensor.

19. The information handling device of claim 11, wherein the instructions are further executable by the processor to adjust the physical position of the camera sensor back to an original physical position subsequent to the stitching.

* * * * *